United States Patent [19]
Klimaszewski et al.

[11] 3,820,920

[45] June 28, 1974

[54] POWER TRANSMISSION

[75] Inventors: Richard A. Klimaszewski, Warren; Kenneth Court, Detroit, both of Mich.

[73] Assignee: Sperry Rand Corporation, Troy, Mich.

[22] Filed: Dec. 18, 1972

[21] Appl. No.: 315,944

[52] U.S. Cl. ............................ 417/213, 417/218
[51] Int. Cl. ............................................ F04b 49/00
[58] Field of Search .......... 417/213, 218, 220, 221, 417/222, 213 U, 218 P, 220 D, 221 A, 22 C, 22 T, 22 E; 60/450

[56] References Cited
UNITED STATES PATENTS

| | | |
|---|---|---|
| 2,892,311 | 6/1959 | Van Gerpen .................... 60/450 |
| 3,635,021 | 1/1972 | McMillen et al. .................. 417/213 |
| 3,644,063 | 2/1972 | Bosch ............................... 417/213 |

*Primary Examiner*—William L. Freeh
*Assistant Examiner*—G. P. La Pointe
*Attorney, Agent, or Firm*—Theodore Van Meter

[57] ABSTRACT

A pressure regulated variable displacement pump has a pilot operated servomotor controlled by a pilot valve which is responsive to pump outlet pressure through the medium of a continuous flow bleed circuit containing a pilot relief valve. Two fixed orifices are provided in the bleed circuit, one ahead of the control chamber of the pilot valve and one beyond it which together make the pilot valve responsive not only to pressure changes in the pump output, but also to the first derivative or rate of change of such pressure.

3 Claims, 2 Drawing Figures

PATENTED JUN 28 1974 3,820,920

POWER TRANSMISSION

In the application of pressure regulated variable displacement hydraulic pumps to hydraulic power transmission systems, the achievement of high dynamic performance, that is, rapid and accurate response to changes in pressure, becomes seriously affected by the elastic characteristics of the system which the pump supplies. One of the more critical parameters controlling the stability and dynamic performance of a pressure regulated pump is the flow gain of the regulator. If made too large, the pump becomes unstable, particularly in highly elastic systems. If made too small, the dynamic performance becomes unacceptable for today's requirements. The approach to overcoming this problem lies in the provision of derivative feedback so that the regulator responds not only to changes in pressure but to the rate of change or the first derivative of the pressure change. This approach is exemplified in the patent to Straznickas 3,563,675. Such an approach, however, involves the introduction of additional devices increasing the cost and complication of the regulator as compared with one not having the derivative feedback feature.

The present invention aims to provide a pump pressure regulator having the derivative feedback feature with substantially no increase in cost as compared with one omitting this feature.

The invention contemplates a pilot operated pressure controlled variable displacement hydraulic pump comprising a servomotor for adjusting the pump displacement, a pilot valve for controlling the servomotor, operating means for the pilot valve including piston means exposed to pump outlet pressure, opposed piston means also exposed to pump outlet pressure, a first restricted orifice between the two piston means, an exhaust passage leading from the second piston means, the exhaust passage including a pilot relief valve and a second restricted orifice, whereby a continuous bleed flow occurs through the orifices and relief valve and the motion of the pilot valve is governed by the rate of change of pump outlet pressure.

IN THE DRAWING

Figure 1:
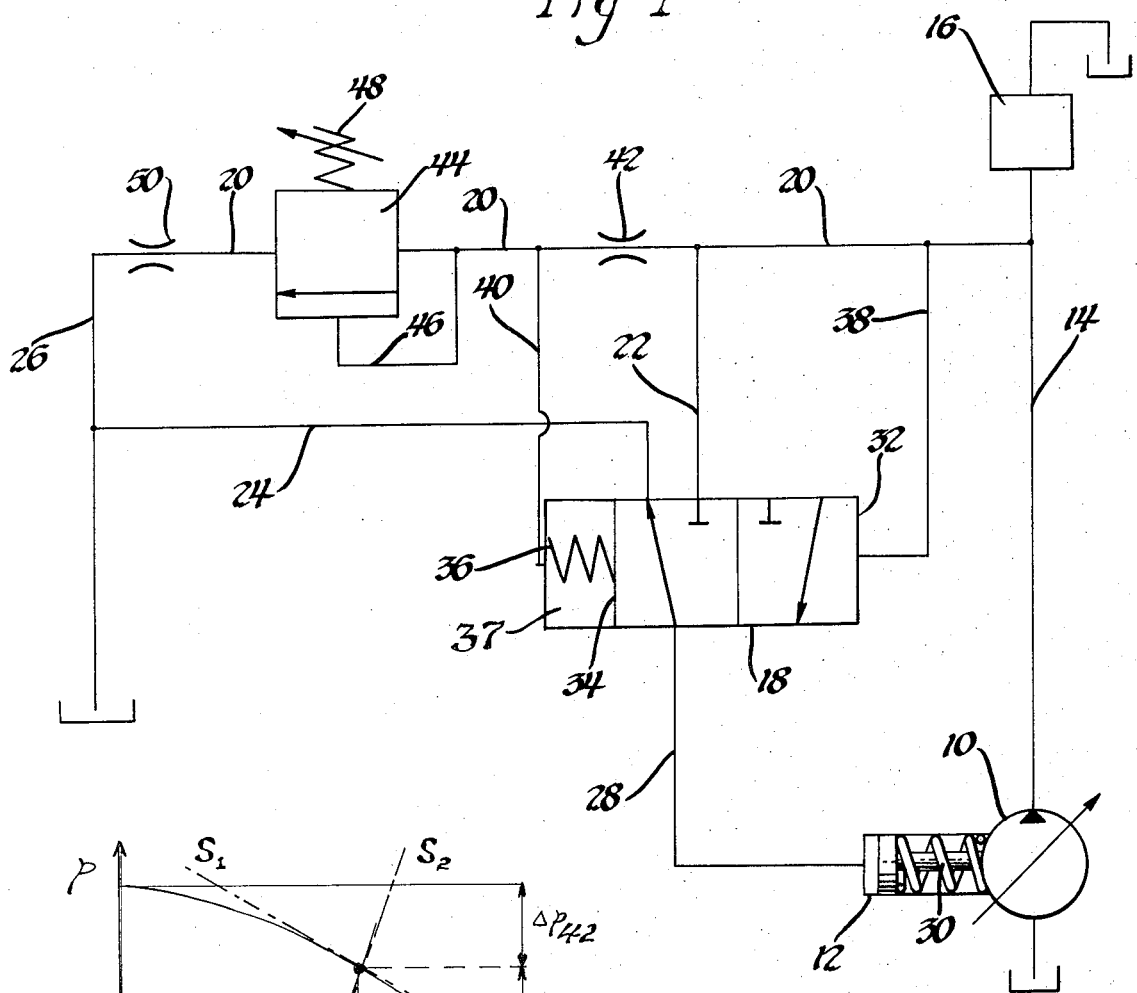
FIG. 1 represents a circuit diagram of a pump and control system incorporating a preferred form of the present invention.

A variable displacement pump 10 has a spring biased hydraulic servomotor 12 for adjusting its displacement. The pump 10 delivers its fluid into a delivery line 14 which feeds fluid to a motive power system 16. Depending upon such factors as length of hydraulic lines and their materials of construction, the types of hydraulic motors utilized, and the inertia as well as the spring rates of the loads driven by the motors, the elastic characteristics of the motive power system 16 as a whole may vary over a wide range from system to system.

The servomotor 12 is controlled by a three-way pilot valve 18 for selectively admitting or exhausting fluid to or from the servomotor. For this purpose, a branch line 20 leads from the delivery line 14 and via a branch 22 to the valve 18. An exhaust conduit 24 leads from the valve 18 to an exhaust conduit 26. The output of valve 18 is directed to servomotor 12 through a conduit 28. While the servomotor 12 is biased by a spring 30, it will be understood that it could as well be biased by delivery line pressure applied to the small area of a differential piston. Likewise, the servomotor 12 could be double-acting one and the valve 18 a four-way directional valve. All of these being alternative constructions, well understood in the art of power hydraulics.

Pilot valve 18 is shifted by opposed piston means indicated at 32 and 34 which are preferably of equal area. Also a spring 36 located in chamber 37 biases the valve spool toward the right. The two piston areas are subjected to the pump output pressure through branch conduits 38 and 40 which are connected to the branch 20 from delivery line 14. However, a fixed restricted orifice 42 is inter-posed between branches 38 and 40. Beyond the restrictor 42 and branch 40, the branch line 20 connects with a pilot relief valve 44 which through its control branch 46 operates the valve against a spring 48 to limit the pressure in conduit 20 to an adjustable predetermined value. Beyond the valve 44, the line 20 leads to a second fixed orifice 50 which discharges into the exhaust conduit 26.

In operation, with the pump running the delivering at less than maximum flow into delivery line 14 and system 16, under steady state conditions, the fluid requirements of system 16 will determine the position to which servomotor 12 settles. Under these conditions there is a steady quiescent flow through the bleed circuit 20–26, which includes the first restrictor 42, the pilot relief valve 44 and the second restrictor 50. This is a small continuous flow. The pressure drop through the restrictor 42 exactly balances the force of the spring 36 applied over the area of piston 32, and thus pilot valve 18 remains in its neutral position, neither admitting fluid to nor exhausting it from the servomotor 12.

Upon an increase in pressure in delivery line 14, occasioned by a decrease in delivery requirements at the system 16, this higher pressure will be transmitted through conduit 38 to the piston area 32 and shift the pilot valve 18 to the left against spring 36. This motion discharges an additional flow from piston area 34 through conduit 40 to the line 20. The faster the spool moves, the larger will be this increase in flow. However, because of the restriction 50, this additional flow results in an increase in pressure in the conduit 40 which reduces the pressure differential between piston areas 32 and 34 nd thus retards the motion of the spool of pilot valve 18.

This has the effect of reducing the flow gain to the servomotor 12. The faster the spool of pilot valve 18 moves to the left, the higher will be the flow rate over the orifice 50 and thus the higher build-up in conduit 40 and piston area 34, thus resulting in a smaller flow gain. In other words, the faster the rate of pressure rise in delivery line 14, the greater will be the lag of the spool of pilot valve 18 behind the pressure rise and thus the flow gain of the regulator system will vary inversely with the rate of system pressure rise. Similarly, in the event of a decrease in delivery line pressure, an opposite effect is achieved.

Because the spring 36 has a finite spring rate, the change in position of the pilot valve spool 18 results in a change in the quiescent flow rate passing through branch line 20 and orifice 42. This change in flow affects the pressure drop over the orifice 50 which results in an increase in the pressure in spring chamber 37. Thus, there results a change in the hydraulic forces acting on the pilot valve spool 18, which change is a function of the spool position. Thus, in effect this type of circuitry produces a hydraulic equivalent of a "spring rate" acting in conjunction with the mechanical spring 36. It can be shown mathematically that the effect of this "hydraulic spring rate" is, for a true turbulent condition and for a truly incompressible fluid, a combined or equivalent spring rate $K_e$:

$$K_e = [1 + (D_1/D_2)^4] K$$

where
$D_1$ is a diameter of the orifice 42.
$D_2$ is the diameter of the orifice 50.
$K$ is the rate of the mechanical spring 36.

It is evident from this formula that small changes in the diameter ratio of the two orifices has a large effect on the equivalent spring rate. The equivalent spring rate can also be expressed in terms of the slope of the curve resulting from a plot of orifice pressure differential against flow rate through the orifice.
where $$K_e = [1 + (S_1/S_2)]K$$

$S_1$ is the slope of the $p$-$Q$ curve for the orifice 42 at the operating point.
$S_2$ is the slope of the $p$-$Q$ curve for the orifice 50.

Figure 2:
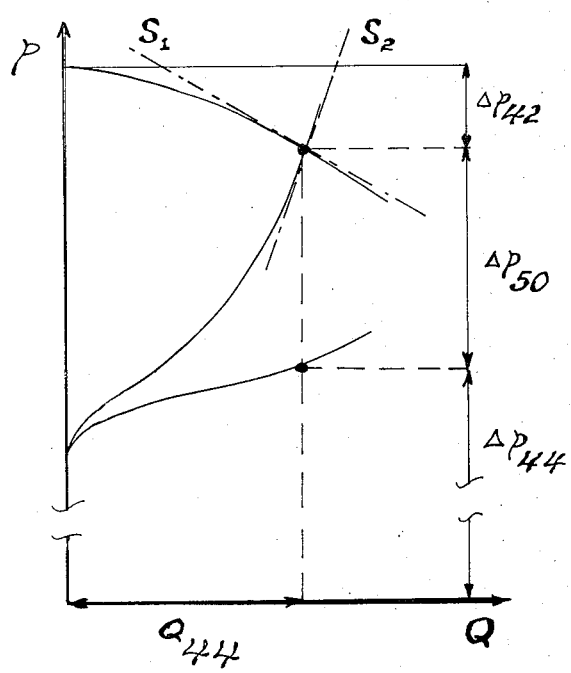
FIG. 2 is a graph of flow against pressure in parts of the circuit.

In general the higher the equivalent spring rate $K_3$ is, the better will be the dynamic performance of the servosystem. These relationships are illustrated in FIG. 2.

It will be noted that because of the pressure drop which is generated at the secondary orifice 50, the cracking pressure of the pilot relief valve 44 has to be set substantially below the nominal pressure setting (determined by adjustable spring 36) which it is desired to maintain in the delivery line 14. This results in a quiescent flow through primary orifice 42, even at delivery line pressure values much below the nominal pressure setting and has the effect of increasing the sensitivity of the pilot valve spool 32 to sudden increase in delivery line pressure. While the pilot relief valve 44 is shown as upstream from the secondary orifice 50, their positions could be interchanged without losing the benefit of the invention.

The volume of fluid in the spring chamber 37, if properly selected, can also have a very beneficial effect upon the primary dynamic response of the pump regulator. Upon a sudden increase in system pressure, that is, with a high rate of pressure rise, the spool will move into the spring chamber ahead of any opposing flow coming through orifice 42 and line 40, and will start to drive the servomotor 12 considerably before the nominal pressure setting is reached. For example with a spring chamber volume of 4 cubic inches and a spool 32 having a 3/8 inch diameter and with a primary orifice 42 having a diameter of 0.030 inches, this effect has been found to take place at a pressure rise rate above 120,000 psi/sec. The result is that pressure overshoot is minimized at high rates of pressure rise in delivery line 14.

Pressure responsive pump regulators incorporating the present invention have proven in actual performance tests to provide accurate pressure regulation with complete stability throughout a range of system elasticity as great as 26 to 1, coupled with a fluid delivery rate range of 5 to 1.

I claim:

1. A pilot operated pressure controlled variable displacement hydraulic pump comprising a servomotor for adjusting the pump displacement to maintain substantially constant delivery pressure, a pilot valve for controlling the servomotor, operating means for the pilot valve including means also exposed to pump outlet pressure and opposed piston means also exposed to pump outlet pressure, a first restricted orifice between the two piston means, an exhaust passage leading from the second piston means and from the first restricted orifice, the exhaust passage including a pilot relief valve and a second restricted orifice, whereby a continuous bleed flow occurs through the orifices and the relief valve and whereby the motion of the pilot valve is governed by the rate of change of pump output pressure.

2. A pump as defined in claim 1 wherein the two restricted orifices are of substantially the same size.

3. A pump as defined in claim 1 wherein the two piston means have substantially the same effective areas.

* * * * *

UNITED STATES PATENT OFFICE
CERTIFICATE OF CORRECTION

Patent No. 3,820,920           Dated June 28, 1974

Inventor(s) Richard A. Klimaszewski et al.

It is certified that error appears in the above-identified patent and that said Letters Patent are hereby corrected as shown below:

Column 4, line 28, after "including" insert -- piston means exposed to pump outlet pressure and opposed piston --.

Signed and sealed this 1st day of October 1974.

(SEAL)
Attest:

McCOY M. GIBSON JR.
Attesting Officer

C. MARSHALL DANN
Commissioner of Patents